US008768132B2

(12) United States Patent
Stewart et al.

(10) Patent No.: US 8,768,132 B2
(45) Date of Patent: Jul. 1, 2014

(54) RIDGE WAVEGUIDE

(75) Inventors: Duncan Stewart, Menlo Park, CA (US); Marco Florentino, Mountain View, CA (US); Nathaniel Quitoriano, Pacifica, CA (US); Charles Santori, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1057 days.

(21) Appl. No.: 12/253,196

(22) Filed: Oct. 16, 2008

(65) Prior Publication Data

US 2009/0180748 A1 Jul. 16, 2009

Related U.S. Application Data

(60) Provisional application No. 61/011,013, filed on Jan. 14, 2008.

(51) Int. Cl.
*G02B 6/10* (2006.01)

(52) U.S. Cl.
USPC .......................................................... 385/130

(58) Field of Classification Search
USPC .......................................................... 385/130
See application file for complete search history.

(56) References Cited

U.S. PATENT DOCUMENTS

| | | | | |
|---|---|---|---|---|
| 5,057,022 A * | 10/1991 | Miller | | 438/31 |
| 5,138,626 A * | 8/1992 | Yap | | 372/46.016 |
| 5,140,149 A * | 8/1992 | Sakata et al. | | 257/436 |
| 6,078,603 A * | 6/2000 | Weegels et al. | | 372/49.01 |
| 6,115,169 A * | 9/2000 | Takagi et al. | | 359/248 |
| 6,154,475 A * | 11/2000 | Soref et al. | | 372/45.011 |
| 6,533,907 B2 * | 3/2003 | Demaray et al. | | 204/192.25 |
| 6,690,871 B2 * | 2/2004 | Lee et al. | | 385/129 |
| 6,836,608 B2 * | 12/2004 | Kishimoto et al. | | 385/130 |
| 6,920,253 B2 * | 7/2005 | Tan et al. | | 385/1 |
| 7,333,689 B2 * | 2/2008 | Menon et al. | | 385/28 |
| 2003/0138178 A1 * | 7/2003 | Kimerling et al. | | 385/2 |
| 2004/0131098 A1 * | 7/2004 | Garbuzov et al. | | 372/45 |
| 2007/0101927 A1 | 5/2007 | Keyser et al. | | |
| 2007/0230886 A1 * | 10/2007 | Chen et al. | | 385/132 |
| 2008/0253728 A1 * | 10/2008 | Sparacin et al. | | 385/132 |

OTHER PUBLICATIONS

"Micrometre-scale silicon electro-optic modulator," by Xu et al, Nature, vol. vol. 435, May 2005, pp. 325-327.*
"Fabrication of ultralow-loss Si/SiO2 waveguides by roughness reduction," Lee et al, Optics Letters, vol. 26, No. 23, Dec. 2001, pp. 1888-1890.*
"Microphotonics devices based on silicon microfabrication technology," IEEE Journal of Selected Topic in Quantum Electronics, vol. 11, No. 1, Jan. 2005, pp. 232-240.*

* cited by examiner

*Primary Examiner* — Ryan Lepisto
*Assistant Examiner* — Robert Tavlykaev

(57) ABSTRACT

A ridge waveguide with decreased optical losses from surface scattering includes a ridge waveguide with etched surfaces and an optical layer deposited on the ridge waveguide that substantially covers the etched surfaces. A method of reducing optical energy losses from scattering at etched surfaces of a ridge waveguide includes depositing a layer of optical material over the etched surfaces, the layer of optical material filling surface irregularities in the etched surfaces.

20 Claims, 3 Drawing Sheets

RIDGE WAVEGUIDE

CROSS-REFERENCE TO RELATED APPLICATION:

The present application claims priority from provisional application Ser. No. 61/011,013, filed Jan. 14, 2008, the contents of which are incorporated herein by reference in their entirety.

BACKGROUND

Light beams or optical signals are frequently used to transmit digital data between electronic devices, both over long distances and between adjacent circuit boards, between components on a single circuit board, and may even be used between devices on the same chip. An optical signal may also be used for other purposes including position or motion sensing, measurement, reading encoded data, etc.

Consequently, optical technology plays a significant role in modern electronics, and many electronic devices employ optical components. Examples of such optical components include, but are not limited to, optical or light sources such as light emitting diodes and lasers, waveguides, fiber optics, lenses and other optics, photo-detectors and other optical sensors, optically-sensitive semiconductors, and others.

Often, optical resonators are used to selectively filter, switch, or modulate light beams that are used, for example, to transmit data between electronic components. Ring resonators are a type of optical resonator that comprise an optical waveguide in a closed loop. The ring resonator is coupled to a tangential waveguide. When light of an appropriate wavelength is introduced into the loop by the tangential waveguide, the light beam can be manipulated in intensity or amplitude over multiple circuits around the ring resonator. However, optical losses due to scattering and absorption within the ring resonator can reduce the overall efficiency of the ring resonator, resulting in less than optimal performance. Scattering can be caused by rough surfaces at boundaries between materials with different indices of refraction. Absorption can be caused by interaction of the optical energy with absorptive impurities or materials contained in the ring resonator structure.

BRIEF DESCRIPTION OF THE DRAWINGS

The accompanying drawings illustrate various embodiments of the principles described herein and are a part of the specification. The illustrated embodiments are merely examples and do not limit the scope of the claims.

DETAILED DESCRIPTION

Figure 1:
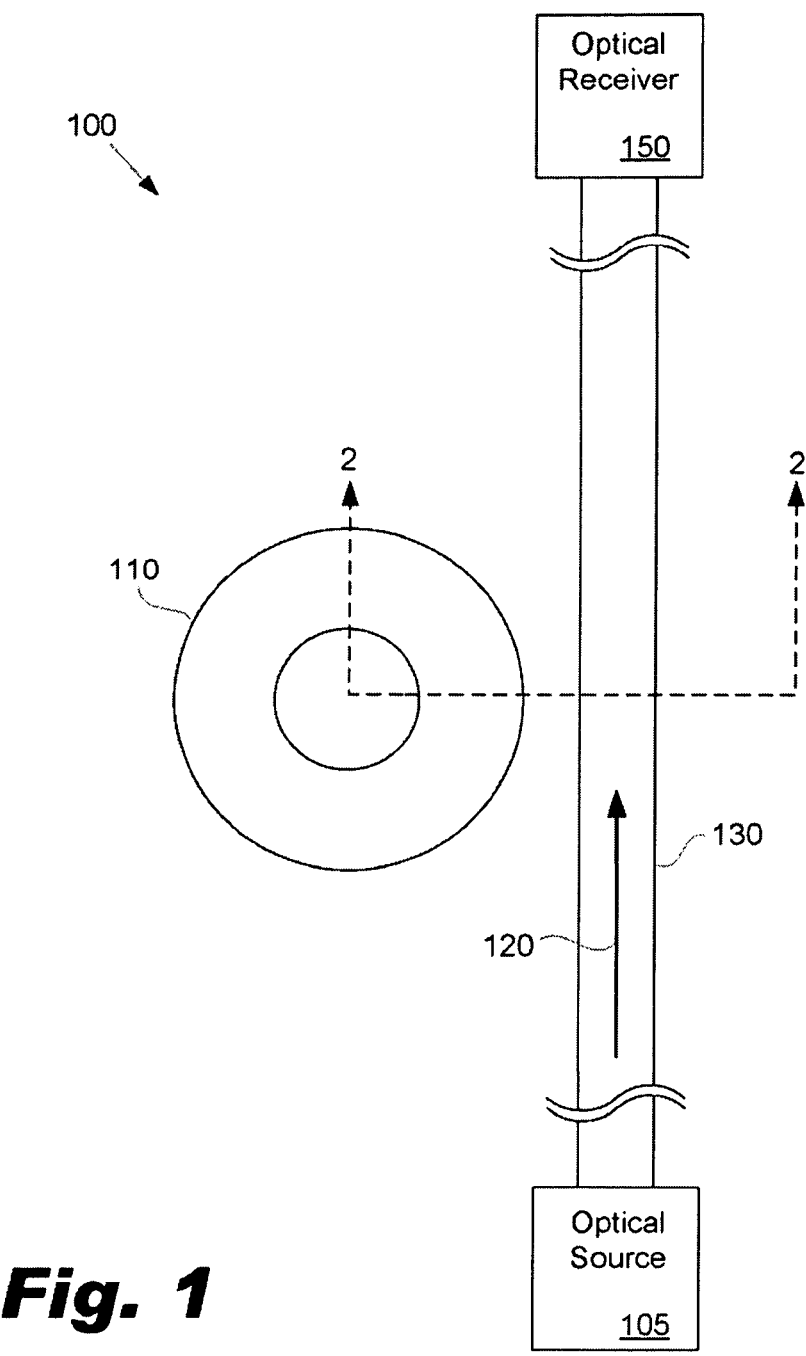
FIG. 1 is an illustrative diagram of one embodiment of an optical resonator system, according to principles described herein.

The present specification discloses systems and methods related to a semi-conductor optical resonator suitable for use as any of a modulator, a photo-detector or a laser source. For example, the present specification describes a waveguide with decreased optical losses from surface scattering at an interface between the waveguide and the ambient air or other overlaying material. The waveguide described includes etched surfaces with a silicon layer being deposited over the etched surfaces so that the silicon layer substantially covers the etched surfaces and prevents optical scattering due to surface roughness produced by the earlier surface etching.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims, the term "optical source" refers to a device from which optical energy originates. Examples of optical sources as thus defined include, but are not limited to, light emitting diodes, lasers, light bulbs, and lamps.

As used in the present specification and in the appended claims, the terms "optical cavity" and "optical resonator" refer to a structure that sustains optical energy having a certain resonant wavelength or range of wavelengths and suppresses or attenuates optical energy of other wavelengths by destructive interference.

The term "optically active" or "active optical layer" refers to a material that responds to incidence of a photon or optical energy by creating a charge that can be collected by an electrode or a material that changes optical characteristics in the presence of an electrical or magnetic field.

As used in the present specification and in the appended claims, the term "dielectric" broadly refers to a material that provides electrical insulation. In various embodiments described herein, silicon dioxide may be used as a dielectric. In alternative embodiments, the dielectric layer may be composed of different material. The dielectric layer may be formed from or include materials, or combination thereof, such as silicon oxide, silicon nitride, aluminum oxide, aluminum nitride, as well as those materials generally characterized as dielectrics or insulators.

As used in the present specification and in the appended claims, the term "p-type semiconductor" refers to any semiconductor layer to which impurity acceptor materials have been added such that electron holes are the majority charge carriers, while electrons are minority charge carriers. Similarly, the term "n-type semiconductor" refers to any layer to which impurity electron donor materials have been added such that electrons are the majority charge carriers, while electron holes are minority charge carriers.

Photonic integrated circuits, such as optical resonator systems, rely on efficient optical interconnections to transmit light between the components and devices that form these integrated circuits. Conventional optical interconnections often employ thin-film optical waveguides as device interconnects. Specifically, circuit fabricators use thin films of semiconductor materials to form optical waveguides that are integrated within optical electronic devices formed on the substrate of a photonic integrated circuit.

In some embodiments, an optical resonator system is constructed on a substrate using standard photolithography techniques. The optical resonator system may include a ring resonator that is optically coupled to an adjacent waveguide such that the optical energy within the waveguide can be selectively directed into the ring resonator. According to one exemplary embodiment, the ring resonator comprises an annular optical cavity, an active optical layer and two electrodes.

In some embodiments, the light transmissive portions of the optical resonator system are covered by an overlaying material. In other embodiments, the light transmission portions are formed and then left exposed to ambient air.

When a light transmissive material is surrounded or otherwise, bounded by another material having a lower refractive index, either air or another deposited material, light propagating through the inner, transmissive material is reflected at the boundary between the two materials. This produces a guiding effect. However, light intensity can also be lost at this boundary because of edge effects, surface imperfections, roughness, and the like. In this regard, it is desired that optical propagation losses be minimized in such waveguides to provide efficient photonic integrated circuits.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Unless otherwise indicated, all numbers expressing quantities, measurements and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained for a particular application. The scale, dimensions, and proportions of the exemplary elements and systems illustrated in the accompanying figures may have been modified to more dearly convey the inventive concepts.

The principles disclosed herein will now be discussed with respect to exemplary optical resonator systems and exemplary systems and methods of utilizing optical resonator systems. Throughout the specification, specific examples are used to more concisely convey the principles disclosed. However, the scope of the specification is not limited by the specific examples used to illustrate the principles disclosed.

FIG. 1 is an illustrative diagram of one embodiment of an optical resonator system (100). The optical resonator system can be comprised of a ring resonator (110) and an optical waveguide (130) arranged tangentially with respect the ring resonator (110). The ring resonator (110) and the optical waveguide (130) are in optical communication with each other at the tangential point between the ring resonator (110) and optical waveguide (130). According to one exemplary embodiment, the ring resonator (110) and the optical waveguide (130) are in physical contact with each other. In an alternative embodiment, there is a slight gap between the edge of the ring resonator (110) and the optical waveguide (130) at the tangent point. The distance between the ring resonator (110) and the optical waveguide (130) is one factor in achieving a condition known as critical coupling. A state of critical coupling occurs when the coupling rate between the resonator and the waveguide is equal to the total scattering and absorption rate inside of the resonator. Critical coupling can be useful, when the ring resonator (110) is used as a modulator of the light energy passing through the optical waveguide (130).

The ring resonator (110) and the optical waveguide (130) may be fabricated out of a variety of semiconductor materials, such as silicon, gallium arsenide, germanium, and the like. The semiconductors may be doped with appropriate impurity atoms such as phosphorus, arsenic, boron, aluminum, selenium, tellurium, germanium, silicon, beryllium, zinc, cadmium, or other elements. In some embodiments, an insulating layer such as silicon dioxide may be fabricated on a supporting substrate and encapsulate the optical components (110, 130).

Additionally, the ring resonator (130) and optical waveguide (130) can be constructed on or from other materials that are suited to a particular application, such as glass or plastic. If the application calls for electrodes, the electrodes or other conductive paths can be formed from metals, semiconductors, or other materials.

The optical resonator system (100) has a resonant frequency that is at least partially determined by factors such as the cross-sectional dimensions of the optical transmission cavity within the ring resonator (110) and the waveguide (130), the annular dimensions of the ring resonator (110), the material properties of various components, electrical or magnetic fields and the operating temperature of the optical resonator system (100). The ring resonator (110) is configured to sustain optical energy having a wavelength corresponding to the resonant frequency of the ring resonator (110) or within a range of wavelengths above and below the resonant frequency of the ring resonator (110). Other optical energy at other wavelengths is attenuated or suppressed by destructive interference.

According to one exemplary embodiment, optical energy (120) is generated by an optical source (105), such as a laser or a light emitting diode (LED), and enters the optical resonator system (100) through a first end of the waveguide (130). In one embodiment, an off-chip light source, such as a diode laser or light emitting diode, directs optical energy into the waveguide (130). In another embodiment, the light source that directs optical energy into the waveguide (130) is integrated into the same integrated circuit (IC) chip as the optical resonator system (100). The optical energy (120) within the waveguide (130) can be comprised of a single wavelength or a combination of optical wavelengths to which the waveguide (130) is semi-transparent. For example, a silicon waveguide is capable of transmitting light with wavelengths from about 1100 nm to 2 microns. A waveguide may be selected from a wide variety of semi-transparent materials as best suits a particular application.

Optical energy having the correct wavelength (i.e. at or near the resonant frequency of the ring resonator) enters the ring resonator (110) at the tangential point between the ring resonator (110) and the waveguide (130). The optical energy within the ring resonator (110) can be manipulated in intensity or amplitude over multiple circuits around the annulus of the ring resonator (110).

As noted above, ring resonators may be used in many different optical devices, such as detectors, modulators, and lasers. When the ring resonator is being used in a detector, a portion of the optical energy within the annular optical cavity absorbed by the active optical layer is collected to generate a detection signal. Specifically, a subset of absorbed photons generate electron/hole pairs which are collected by respective electrodes, creating a voltage or current that can be sensed and is proportional to the number of photons absorbed by the active optical layer. Thus, in this configuration, the ring resonator acts as a detector by converting optical energy into an electrical signal.

In other embodiments, the ring resonator can be used as a modulator. In such examples the ring resonator can be selectively coupled to a waveguide such that the optical energy traveling through the waveguide can be modulated by the ring resonator. When the ring resonator is being used as a modulator, electrical voltages are applied across opposed electrodes to attenuate the optical signal often by controlling or changing the photon absorption characteristics or the refractive index of the active optical layer of the ring resonator. The photon absorption characteristics and refractive index of the active optical layer directly affect the optical coupling between the ring resonator and the waveguide. Consequently, changes in the optical coupling characteristics between the ring resonator and the waveguide allow the modulation of optical energy as it passes through the waveguide along the interface with the ring resonator.

For a modulator in its "off" state or for a detector, it is desirable to operate the ring resonator close to the critical coupling condition, where the coupling rate between the resonator and the waveguide is equal to the total scattering and absorption rate inside of the resonator. In this situation, all of the optical energy in the waveguide is transferred to the ring resonator, where it is scattered or absorbed.

However, as noted above, undesirable optical losses within the ring resonator can reduce the overall efficiency of the ring resonator, resulting in less than optimal performance in any of these applications. The undesirable optical losses may result from any or all of several causes including edge effects, surface imperfections, material impurities, roughness, etc. These causes of undesirable optical energy losses will be described in more detail below. When the ring resonator is being used as a detector, these undesirable losses reduce the quantum efficiency, making the ring resonator a less sensitive photo-detector. When the ring resonator is being used as a modulator, these undesirable losses increase the resonance linewidth, resulting in a higher electrical power needed to drive the modulator. If the undesirable losses are not repeatable for each fabrication run, then consistently obtaining the critical coupling condition also becomes impossible, and the modulation depth is reduced.

In conventional methods, optical waveguides are generally formed on a substrate by photolithography. However, optical waveguides can be constructed on other substrates, such as plastic and glass, by using appropriate manufacturing and design techniques. One type of optical waveguide formed using photolithography is known as a ridge waveguide. Ridge waveguides are typically made by masking a portion of an optically transmissive layer deposited on the substrate and etching away or otherwise removing an exposed portion so as to define the optical waveguide including the guiding side walls of the waveguide. As a result, the cross-section of the waveguide is normally square or trapezoidal in shape.

When the light transmitting material of the waveguide is shaped by etching in this way, the etching can produce rough side walls of the waveguide. As mentioned above, undesirable optical transmission losses can occur at and because of those roughened side walls.

Additionally, the interface between layers of different materials that make up the waveguide, for example, an optically transmissive waveguide material and a surrounding dielectric material, can cause undesirable losses due to optical energy scattering. This may be a function of the difference in the indices of refraction of the two materials.

Thus, optical energy losses at interfaces and fabrication surfaces are typical and can be a function of a number of factors including surface roughness, difference in index of refraction of the two mating materials, impurities and other factors. As noted above, any of these factors causing optical losses will decrease the efficiency of the waveguide or ring resonator.

Figure 2:
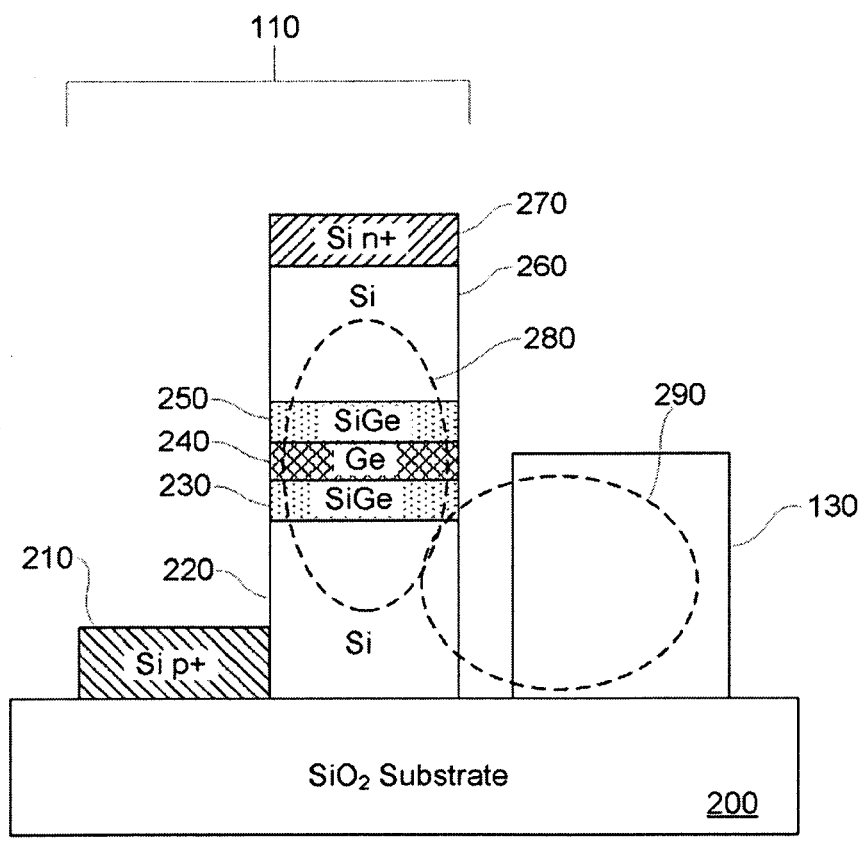
FIG. 2 is an illustrative cross-sectional diagram of one embodiment of a ring resonator and waveguide, according to principles described herein.

FIG. 2 is an illustrative cross-sectional diagram of one exemplary embodiment of the optical resonator system (100) comprising a ring resonator (110) and a waveguide (130). The cross-sectional view in FIG. 2 has been taken across the dotted line 2-2 in FIG. 1.

In the example of FIG. 2, the cross-sectional diagram is that of an exemplary ring resonator (110) formed using lithographic techniques on a substrate (200). Also shown is an exemplary waveguide (130) that lies to one side of, and is optically coupled with, the ring resonator (110).

According to one illustrative embodiment, the optical resonator system (100) is constructed using standard lithographic techniques on a silicon-based substrate. By way of example and not limitation, the silicon-based substrate may be coated with a dielectric layer, such as a silicon dioxide layer (200).

The waveguide (130) is constructed to be tangential to the annular optical cavity of the ring resonator (110). The optical cavity comprises a first silicon layer (220), a thin layer of silicon/germanium alloy (230) is used as a transition layer to absorb lattice stresses that result from the different unstressed lattice constants between the first silicon layer (220) and a germanium layer (240). In this example, the germanium layer (240) acts as the active optical layer within the ring resonator (110). Another silicon/germanium alloy layer (250) similarly acts as a transition layer between the germanium layer (240) and a second silicon layer (260).

Above the second silicon layer (260), a heavily doped n-type semiconductor layer (270) is deposited. Additionally, a heavily doped p-type semiconductor layer (210) is deposited at the base of the first silicon layer (220). These doped layers (210, 270) form electrodes which collect electrical charges when the resonant ring (110) is used as an optical detector. When the ring resonator (110) is used as a modulator, the electrodes (210, 270) can be used as a means of selectively applying an electrical field to allow for modulation of the optical energy passing through the waveguide (130).

According to one exemplary embodiment, the two electrodes (210, 270) are formed by doping silicon with appropriate materials to create a high density of free charge carriers within the doped silicon region. Although one electrode is designated as being n-doped and the other is designated as being p-doped, the p-doped and n-doped layers can be interchanged without affecting the performance of the ring resonator as a detector or modulator.

Losses of optical energy may also occur due to absorption. In general, the heavily doped regions contain impurities that may strongly absorb the light within the ring resonator. In some instances, this is desirable. For example, the germanium layer (240) may absorb optical energy traveling within the ring resonator and converts portion of that energy into an electrical charge. However, in other cases, the absorption of optical energy can be undesirable and result in reduced efficiency and performance of the ring resonator. A typical problem occurs when the optical energy is absorbed by the heavily doped electrodes (210, 270). In this case, the optical energy that is absorbed does not serve a useful purpose and represents an undesirable loss.

Also shown in FIG. 2 are dotted ovals that represent the ring resonator optical mode (280) and the waveguide optical mode (290). An optical mode is the natural shape the optical/electrical field assumes as it propagates through a given optical cavity. As can be seen from FIG. 2, the waveguide optical mode (290) encompasses regions in both the waveguide (130) and the ring resonator optical cavity layers (220, 230, 240, 250, 260). This overlap creates optical coupling between the waveguide (110) and the resonant ring optical cavity (220, 230, 240, 250, 260).

The optical energy contained within the ring resonator (110) has a distinct optical mode (280) with a different orientation and shape. The orientation and shape of the optical modes (280, 290) is influenced by the geometry of the waveguide and the materials through which the optical energy passes.

Typically, materials used in fabricating waveguides have relatively high optical indices of refraction. The optical index of refraction for a particular material or medium is a measure of how much the speed of light is reduced within that material or medium. The optical index of refraction is one factor in determining the angle change of a ray crossing the interface between two different materials having different indices of refraction.

Additionally, light can be reflected from surfaces that have a refractive index different from that of their surroundings or mating materials. For example, silicon has an optical index of refraction of 4-3.5 within wavelengths of interest, and germanium has an optical index of refraction between 5-4.5 for the same wavelengths. This reflective scattering can also depend on the surface roughness at the interface between the two materials. The greater the difference between the indices of refraction of the mating materials, the more optical scattering is produced by any surface roughness at the interface surface.

The geometry and composition of the layers within the ring resonator (110) can be altered to influence the shape of the optical mode (280) and reduce undesirable losses of optical energy due to absorption or scattering by the electrode layers (210, 270). By way of example and not limitation, the composition of the transition layers (230, 250) can be altered. The transition layers (230, 250) are made up of a silicon germanium alloy which can be represented as $Si_xGe_{1-x}$. In this representation of the germanium alloy, the x subscript represents the amount of silicon in the alloy, with the balance being germanium.

By altering the component ratios, the index of refraction of the transition layers can be modified to minimize losses within the ring resonator at the interfaces between the silicon layers (220, 260), the transition layer (230), and the germanium layer (240). For modulators and detector applications, the ratio of silicon and germanium in the alloy can be chosen to match the round trip absorption to the waveguide coupling rate, which, in turn, is determined by the desired cavity line width. Additionally, the geometry or composition of the layers can be altered to move or reshape the optical mode (280) such that there is less scattering produced at the exterior edges of the ring resonator (110). The optical mode's vertical position can be designed by using the varying optical index of refraction of layers of germanium and graded layers of $Si_xGe_{1-x}$ to shift the position and/or vertical shape optical mode. In general, the optical mode is drawn toward higher index materials, such as germanium. If germanium, $Si_xGe_{1-x}$, or other higher index layers are placed at the center of the ring resonator (110), the vertical position of the optical mode will shift away from the heavily doped electrical contacts at the top and bottom of the ring resonator (110), thereby reducing the undesirable interaction of the optical energy with the heavily doped electrode material.

Figure 3:
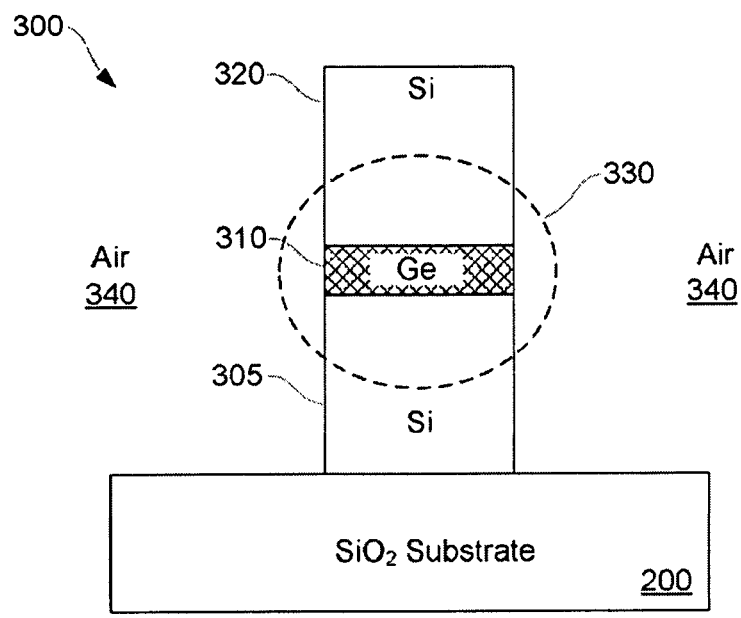
FIG. 3 is an illustrative cross-sectional diagram of an embodiment of a ring resonator, according to principles described herein.

FIG. 3 is an illustrative cross-sectional diagram of one embodiment of a ring resonator (300). In this embodiment, the ring resonator (300) is of the ridge waveguide type. As noted above, ridge waveguides are constructed by depositing layers of material on a substrate and then etching away portions of the material to leave ridges that are trapezoidal or rectangular in shape. These ridges then become the desired optical pathways or waveguides.

The waveguides can be left exposed to ambient air or may be covered by an overlaying material, for example, a dielectric material. When not covered by another overlaying material, the waveguide is referred to as "exposed." In contrast, when covered by another material other than ambient air, the waveguide is referred to as "buried."

Exposed ridge waveguides may be characterized as space efficient when compared to other optical waveguide geometries such as buried waveguides. The ridge waveguides are configured to confine the optical mode to a greater extent than buried waveguides, in part, because of the large difference between optical index of refraction between the waveguide and the surrounding air. Buried waveguides, on the other hand are surrounded by other solid materials and have lower containment of the optical mode.

As mentioned above, the process of etching ridge waveguides can generate rough surfaces (e.g., 350) where the etching has occurred. This roughness, in combination with the large difference between the optical index of refraction of air (about 1) (340) and the ridge waveguide (about 4) can lead to undesirable optical energy losses due to scattering at those roughened surfaces.

In the exemplary ridge ring resonator shown in FIG. 3, a lower silicon waveguide layer is deposited on a silicon dioxide substrate (200) and etched to produce the desired lower waveguide (305). A germanium layer (310) is deposited on top of the lower waveguide (305). The germanium layer (310) typically comprises the active optical layer within the ring resonator (300). An upper waveguide (320) is similarly constructed above the germanium layer (310). For conciseness, other layers which may be present, such as transition layers and electrodes, have been omitted from this illustrative cross-sectional diagram.

The annular optical cavities (305, 320) are transparent to particular wavelengths of light that are to be detected or modulated by the ring resonator (100). Typically, the optical cavities (305, 320) are surrounded by material with a different index of refraction, such as air or another solid. Thus configured, the annular optical cavities (305, 320) serve as optical resonators that sustain optical energy having a certain resonant wavelength or range of wavelengths and suppress or attenuate other optical energy by destructive interference. The physical geometry of an optical cavity (305, 320) can be altered to resonate at specific wavelengths of light by changing the optical cavity's diameter, material, optical index, etc.

In this exemplary embodiment, the ring resonator optical mode (330) is centered on the germanium layer (310) and extends beyond the edges of the optical cavities (305, 320) into the surrounding air (340). This could potentially lead to higher than desired losses due to scattering of the optical energy at the etched interface between the ring resonator (330) and the surrounding air (340). Further, the optical index of refraction between the ring resonator (330) and the surrounding air (340) is large, increasing the loss at the air/solid interface.

Figure 4:
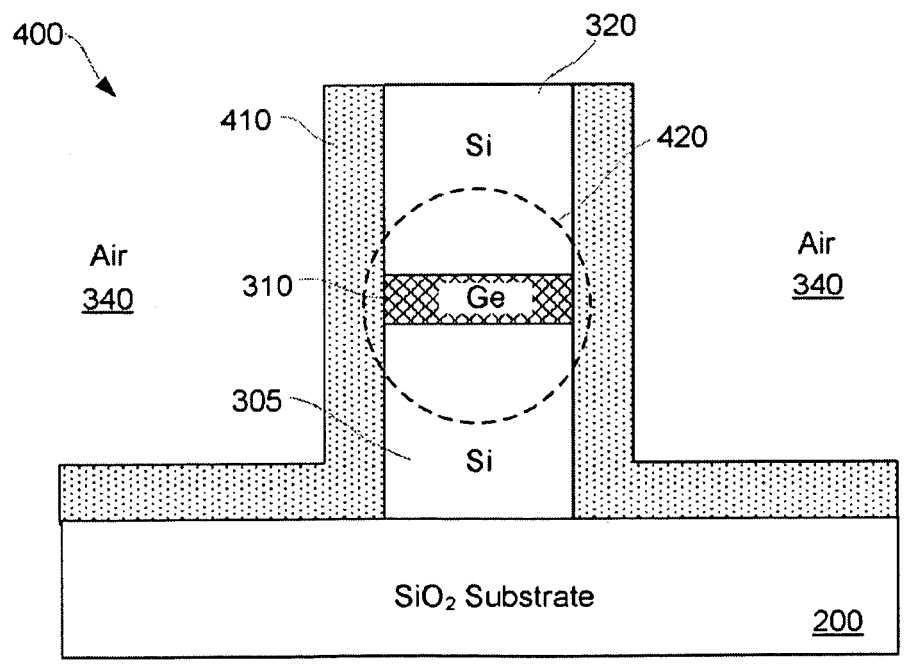
FIG. 4 is an illustrative cross-sectional diagram of an embodiment of a ring resonator, according to principles described herein Throughout the drawings, identical reference numbers designate similar, but not necessarily identical, elements.

FIG. 4 is an illustrative cross-sectional diagram of one exemplary embodiment of a ring resonator (400). The geometry and layers of the components of the ring resonator are similar to that described in FIG. 3, with the addition of an optical layer (410) that coats the outer etched surface of the resonator ring (400). This additional optical layer (410) is deposited on the ridge waveguide so as to substantially cover the etched surfaces and fill surface irregularities in the etched surfaces. The additional optical layer (410) may be made, for example, of silicon, silicon-germanium, or germanium. In the illustrated example, the additional optical layer (410) is made of silicon and will be referred to hereinafter accordingly. By way of example and not limitation, the additional optical layer (410) can be deposited by chemical deposition, physical deposition, or epitaxy.

As the additional semiconductor layer (410) is deposited it fills the voids and smoothes the rough outer surface of the resonator ring (400). According to one embodiment, the deposited silicon can match the lattice spacing of the germanium or silicon surfaces upon which it is deposited. Because the semiconductor layer (410) is deposited without post deposition etching or other processes the surfaces of the semiconductor layer (410) retain a smooth, high quality surface finish.

The optical mode (420) extends beyond the silicon optical cavities (305, 320) and into the semiconductor layer (410). Because the semiconductor layer (410) has smoothed the etched surface by filling and bonding to that surface, the effective surface roughness has decreased. Further, because the added semiconductor layer (410) has a higher optical index of refraction than the air (340), the light is correspondingly less sensitive to the surface roughness that remains. The thickness of the semiconductor layer (410) can be adjusted to further decrease the undesirable optical losses.

According to one embodiment, the semiconductor layer (410) is thick enough that substantially the entire optical mode (420) is contained within the ring resonator structure (400). According to another exemplary embodiment, the semiconductor layer (410) is just thick enough to smooth the outer surfaces of ring resonator (400) by filling voids and crevasses.

According to yet another exemplary embodiment, the semiconductor layer (410) could be doped during the deposition process or in a separate operation which diffuses dopant into the existing semiconductor layers (410). The dopant could be selected to give the desired optical properties to the semiconductor layer (410), such as increasing adhesion, decreasing surface roughness, matching lattice spacing, or changing the optical index of refraction of the semiconductor layer (410). Additionally, the dopant concentration could be configured to produce a varying optical index of refraction through the thickness of the semiconductor layer (410). By way of example and not limitation, the dopant could lower the optical index of refraction of the semiconductor layer (410). By diffusing the dopant into the semiconductor layer (410), higher concentrations of dopant could be obtained on the outer surface of the semiconductor layer (410), resulting a lower optical index of refraction at the air interface.

In one exemplary embodiment, the creation of a layer that both smoothes the outer surfaces of the waveguide and provides a lower index dad on the sides of the wave guide could be accomplished using thermal oxidation of the waveguide surface. Thermal oxidation is a way to produce a thin layer of oxide (usually silicon dioxide) on the surface of a semiconductor. Thermal oxidation of silicon is typically performed at an elevated temperature (between 800° C. and 1200° C.). The process can use either water vapor or molecular oxygen as the oxidant. The thermal oxidization process reacts the surface of the substrate with oxygen from the surroundings to form a new layer of oxide that both smoothes the surface and has a lower index of refraction than the substrate. The thermal oxidization process could be performed on a layer or series of layers, including doped layers and layers of different material that are already in place.

By adding an extra semiconductor layer (410) to the ring resonator (400), the ring resonator (400) exhibits lower losses than conventional ridge waveguides (300) but higher confinement than buried waveguides. Because the additional layer (410) minimizes or eliminates surface imperfections and roughness, a low loss waveguide or ring resonator could be constructed with relaxed fabrication specifications.

FIG. 4 illustrates the addition of the extra semiconductor layer (410) in an exposed ring resonator configuration. However, it will be appreciated that the advantages of the extra semiconductor layer (410) can also be realized in a buried ring resonator configuration in which an overlaying layer (360) of material is deposited over the extra semiconductor layer (410).

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A ridge waveguide with decreased optical losses from surface scattering and absorption comprising:
   an optical cavity with etched sidewalls, said optical cavity being formed on a substrate; said optical cavity further comprising an optically active layer, said optically active layer having a first index of refraction and being sandwiched between a first layer and a second layer having lower indexes of refraction;
   transition layers interposed between said optically active layer and said first and second layers, said transition layers having a second index of refraction different from said first index of refraction; and
   an optical cladding layer deposited over said etched sidewalls, said optical cladding layer being doped such that said optical cladding layer has an index of refraction gradient through its thickness.

2. The ridge waveguide of claim 1, wherein said ridge waveguide is a ring resonator and further comprises
   a top electrode, said top electrode being disposed directly on said first layer; and
   a bottom electrode, said bottom electrode being disposed directly on said second layer.

3. The ridge waveguide of claim 2, wherein a thickness or composition of said transition layers are selected to alter the position or cross-sectional profile of an optical mode contained within said ridge waveguide such that absorption of optical energy contained within said ridge waveguide by said top electrode and said bottom electrode is minimized.

4. The ridge waveguide of claim 3, wherein said optically active layer is a germanium or silicon-germanium alloy layer.

5. The ridge waveguide of claim 4, wherein a ratio of silicon and germanium comprising said silicon germanium alloy is selected such that a round-trip absorption of said ring resonator matches a waveguide coupling rate of said ring resonator.

6. The ridge waveguide of claim 1, in which at least a portion of said optical cladding layer has an index of refraction lower than said first and second layers.

7. The ridge waveguide of claim 1, in which said optical cladding layer comprises substantially intrinsic silicon.

8. The ridge waveguide of claim 1, in which said optical cladding layer has a first surface and a second surface, the first surface being in optical contact with an outer surface of said ring resonator and said second surface being exposed to the air; in which said index of refraction of said optical cladding layer decreases through a thickness of said optical cladding layer, said first surface having a higher index of refraction than said second surface.

9. The ridge waveguide of claim 1, in which said optical cladding layer is deposited by one of: chemical vapor deposition, physical deposition, or epitaxy.

10. The ridge waveguide of claim 1, in which said optical cladding layer is an additional layer of substantially intrinsic silicon deposited over said etched side walls, said substantially intrinsic silicon forming a matrix, a dopant species being diffused into said matrix to form said index of refraction gradient through a thickness of said optical cladding layer.

11. A method for shaping optical modes within a ring resonator comprising:
   tuning a round trip absorption of said ring resonator to match an optical coupling rate between said ring resonator and a tangential ridge waveguide by altering a silicon germanium ratio of an optically active layer;
   interposing said optically active layer between upper and lower annular layers; said optically active layer having a higher index of refraction than said upper and lower annular layers; and
   depositing an optical cladding layer over at least a portion of said ring resonator, at least a portion of said optical cladding layer having an index of refraction lower than said upper and lower annular layers,
   in which said optical cladding layer has a first surface and a second surface, the first surface being in optical contact with an outer surface of said ring resonator and said second surface being exposed to the air; in which said index of refraction of said optical cladding layer decreases through a thickness of said optical layer, said first surface having a higher index of refraction than said second surface.

12. The method of claim 11, further comprising placing a tangential ridge waveguide adjacent to said ring resonator such that a frequency of optical energy passing through said ridge waveguide is critically coupled to said ring resonator.

13. The method of claim 11, further comprising depositing a first electrode on an upper surface of said upper annular layer and depositing a second electrode on said lower annular layer.

14. The method of claim 13, further comprising modulating the optical energy carried within said tangential ridge waveguide by altering optical absorption of said optical energy by said optically active layer by applying a voltage across said first electrode and said second electrode.

15. The method of claim 11, in which said optical cladding layer is deposited by one of: chemical vapor deposition, physical deposition, or epitaxy.

16. The method of claim 15, further comprising doping said optical cladding layer such that said optical layer has an index of refraction gradient.

17. The method of claim 11, in which said optical cladding layer covers only etched side surfaces of said ring resonator.

18. The method of claim 11, further depositing a transition layer between said optically active layer and at least one of said upper and lower annular layers.

19. The method of claim 18, further comprising altering a chemical composition of said transition layer to match the round trip absorption to an optical coupling rate between said ring resonator and said tangential ridge waveguide.

20. The method of claim 11, further comprising doping said optical cladding layer by diffusing a dopant into said optical cladding layer after deposition of said optical cladding layer.

* * * * *